US008697312B2

(12) United States Patent
Shibata et al.

(10) Patent No.: US 8,697,312 B2
(45) Date of Patent: Apr. 15, 2014

(54) CELL STACK OF FUEL CELL AND METHOD OF FASTENING CELL STACK OF FUEL CELL

(75) Inventors: Soichi Shibata, Osaka (JP); Hiroki Kusakabe, Osaka (JP); Shigeyuki Unoki, Osaka (JP); Yoshiki Nagao, Osaka (JP); Norihiko Kawabata, Osaka (JP); Yusuke Ikeshima, Osaka (JP)

(73) Assignee: Panasonic Corporation, Osaka (JP)

( * ) Notice: Subject to any disclaimer, the term of this patent is extended or adjusted under 35 U.S.C. 154(b) by 564 days.

(21) Appl. No.: 12/718,760

(22) Filed: Mar. 5, 2010

(65) Prior Publication Data

US 2010/0159345 A1 Jun. 24, 2010

Related U.S. Application Data

(63) Continuation of application No. PCT/JP2009/006763, filed on Dec. 10, 2009.

(30) Foreign Application Priority Data

Dec. 16, 2008 (JP) ................................. 2008-319837
Dec. 16, 2008 (JP) ................................. 2008-319838

(51) Int. Cl.
*H01M 2/08* (2006.01)
*H01M 8/24* (2006.01)
*H01M 8/02* (2006.01)

(52) U.S. Cl.
CPC .............. *H01M 8/247* (2013.01); *H01M 8/248* (2013.01); *H01M 8/0271* (2013.01); *Y02E 60/521* (2013.01); *Y02E 60/50* (2013.01)
USPC ........... 429/511; 429/452; 429/453; 429/470; 429/471; 429/467; 429/469; 429/508; 429/516

(58) Field of Classification Search
CPC ..... Y02E 60/50; H01M 8/0271; H01M 8/247; H01M 8/248
USPC .......... 429/452, 453, 463, 467, 469, 470, 471, 429/508, 511, 516
See application file for complete search history.

(56) References Cited

U.S. PATENT DOCUMENTS 5,432,023 A * 7/1995 Yamada et al. ................ 429/442
5,789,091 A * 8/1998 Wozniczka et al. .......... 429/470

(Continued)

FOREIGN PATENT DOCUMENTS

EP 0098676 A1 1/1984
EP 1 760 806 A2 3/2007

(Continued)

OTHER PUBLICATIONS

Extended European Search Report dated Jan. 28, 2013 for corresponding EP Patent Application No. 09833158.0.

*Primary Examiner* — Patrick Ryan
*Assistant Examiner* — Ben Lewis
(74) *Attorney, Agent, or Firm* — McDermott Will & Emery LLP

(57) ABSTRACT

A cell stack of a fuel cell comprises a cell stack body including a cell stack structure including plural cells stacked together; an elastic member disposed at an end of the cell stack structure in a direction in which the plural cells are stacked, and a pair of end plates sandwiching the cell stack structure and the elastic member, and a fastener band extending to surround the cell stack body and to cover a pair of end surfaces and a pair of opposing side surfaces of the cell stack body, the fastener band including a first band engagement portion and a second band engagement portion at both end portions thereof, respectively, and the cell stack body is fastened by the fastener band by direct or indirect engagement between the first band engagement portion and the second band engagement portion.

16 Claims, 14 Drawing Sheets

(56) References Cited

U.S. PATENT DOCUMENTS

| | | | |
|---|---|---|---|
| 5,993,987 A | 11/1999 | Wozniczka et al. | |
| 6,210,823 B1 | 4/2001 | Hatoh et al. | |
| 6,653,008 B1 * | 11/2003 | Hirakata et al. | 429/434 |
| 2002/0142209 A1 | 10/2002 | Kikuchi et al. | |
| 2005/0042493 A1 | 2/2005 | Fujita et al. | |
| 2005/0064268 A1 | 3/2005 | Cho et al. | |
| 2006/0093890 A1 * | 5/2006 | Steinbroner | 429/37 |
| 2006/0251946 A1 | 11/2006 | Makuta et al. | |
| 2007/0052390 A1 | 3/2007 | Kim et al. | |
| 2008/0182152 A1 * | 7/2008 | Erikstrup | 429/34 |
| 2008/0305380 A1 | 12/2008 | Andreas-Schott et al. | |
| 2009/0280359 A1 * | 11/2009 | Bogumil et al. | 429/12 |

FOREIGN PATENT DOCUMENTS

| | | | |
|---|---|---|---|
| JP | 2000-067902 | 3/2000 | |
| JP | 2001-504632 | 4/2001 | |
| JP | 2001-135344 * | 5/2001 | H01M 8/24 |
| JP | 2003-151612 | 5/2003 | |
| JP | 2005-071765 | 3/2005 | |
| JP | 2005-142145 | 6/2005 | |
| JP | 2006-331805 | 12/2006 | |
| JP | 2007-059187 | 3/2007 | |
| JP | 2007-073509 | 3/2007 | |
| JP | 2007-141716 | 6/2007 | |
| WO | WO 98/22990 | 5/1998 | |

* cited by examiner

| POSITIONS OF FIRST ENGAGEMENT PORTION AND SECOND ENGAGEMENT POTION | EVALUATION |
|---|---|
| SUBSTANTIALLY CENTER OF SIDE SURFACE  | ◎ |
| UPPER PORTION AND LOWER PORTION OF SIDE SURFACE  | ○ |
| UPPER PORTION (OR LOWER PORTION) OF SIDE SURFACE  | × |

US 8,697,312 B2

CELL STACK OF FUEL CELL AND METHOD OF FASTENING CELL STACK OF FUEL CELL

This is a continuation of PCT International Application PCT/JP2009/006763 filed on Dec. 10, 2009, which claims priority to Japanese Patent Application Nos. 2008-319837 and 2008-319838, filed on Dec. 16, 2008. The disclosures of these applications including the specifications, the drawings, and the claims are hereby incorporated by reference in its entirety

FIELD OF THE INVENTION

The present disclosure relates to a cell stack of a fuel cell and a method of fastening the cell stack of the fuel cell. More particularly, the present disclosure relates to a cell stack of a fuel cell including a cell stack body fastened using a fastener band, and a method of fastening the cell stack of the fuel cell.

DESCRIPTION OF THE RELATED ART

A cell stack of a typical fuel cell is formed by arranging current collectors, insulating plates and end plates in this order at both ends of a cell stack structure including plural cells (unit cells) stacked, and by fastening this stack structure by fastener rods (bolts and nuts) in a direction in which the cells are stacked (see e.g., Japanese Laid-Open Patent Application Publication No. 2007-59187 (patent document 1). In a fastening structure using the fastener rods (bolts and nuts), since the head portions and tip end portions of the bolts and the nuts protrude from the surfaces of the end plates, the size of the fuel cell increases.

Under the circumstances, various techniques for reducing the size of the fuel cell by reducing the size of the fastening structure of the cell stack have been developed. For example, techniques for fastening the cell stack using a thin fastener band are disclosed (see e.g., Japanese Laid-Open Patent Application Publication No. 2000-67902 (patent document 2) and Translated Japanese Application Publication No. 2001-504632 (patent document 3). In the fuel cells disclosed in patent documents 2 and 3 using the fastener band to fasten the cell stack structure, the end plates and others, the fastener band does not protrude substantially from the surfaces of the end plates. Therefore, the size of the fuel cell can be reduced.

However, in the polymer electrolyte fuel cell disclosed in patent document 2, since a connecting portion of the band is fastened by bolts and nuts, the protruding portions of at least the bolts and the nuts are required as the connecting portion, thereby increasing a weight and a volume of the fuel cell. As a surface area of the fuel cell increases, a heat radiation amount of the fuel cell increases. For example, when the fuel cell is used as an electric power supply in a cogeneration system and therefore heat recovery is necessary, performance of the fuel cell degrades. In addition, the number of steps for fastening the bolts and the nuts and the number of components increases, reducing assembling efficiency.

In the fuel cell stack structure disclosed in patent document 3, since an annular band formed by welding both ends of a band-like member, which is made of metal or the like is used, the cell stack structure is subjected to an unnecessary load or an excess load such as high-temperature heat, in the assembly process. When the band is welded after assembling, heat applied to a weld portion is transmitted to a resin material which is low in heat resistance, such as a gasket or a polymer electrolyte membrane of the cell, degrading durability of the fuel cell.

Furthermore, in the above mentioned conventional fastening method, since it is necessary to adjust each of the plural fastener rods or each of the plural bands, the manufacturing steps increases in number, which is undesirable.

SUMMARY OF THE DISCLOSURE

The present disclosure is directed to solving the above described problem, and an object of the present disclosure is to provide a cell stack of a fuel cell which enables a fuel cell to be compact and have a smaller surface area, and which is assembled with fewer components and fewer steps, without degrading performance of the cell stack in its assembled state, and a method of fastening the cell stack of the fuel cell.

To achieve the above described objective, a cell stack of a fuel cell comprises a cell stack body including a cell stack structure including plural cells stacked; an elastic member disposed at an end of the cell stack structure in a direction in which the cells are stacked; and a pair of end plates sandwiching the cell stack structure and the elastic member; and a fastener band extending so as to surround the cell stack body and so as to cover a pair of end surfaces and a pair of opposing side surfaces of the cell stack body, the fastener band including a first band engagement portion and a second band engagement portion; wherein the cell stack body is fastened by the fastener band by direct or indirect engagement between the first band engagement portion and the second band engagement portion.

In such a configuration, the cell stack of the fuel cell can be made compact and its surface area can be reduced. In addition, the cell stack can be assembled with fewer components and fewer steps without degrading performance of the cell stack in its assembled state.

In the cell stack of the fuel cell of the present disclosure, the fastener band may be disposed such that the first band engagement portion and the second band engagement portion are located on the side surface of the cell stack structure.

The cell stack of the fuel cell of the present disclosure may further comprise an engagement pin. The first band engagement portion and the second band engagement portion may have a first insertion hole and a second insertion hole, respectively; and the engagement pin may be inserted into the first insertion hole of the first band engagement portion and the second insertion hole of the second band engagement portion to cause the first band engagement portion and the second band engagement portion to be engaged with each other via the engagement pin.

In the cell stack of the fuel cell of the present disclosure, the first band engagement portion and the second band engagement portion may be provided such that the first insertion hole and the second insertion hole are arranged in a direction perpendicular to the direction in which the cells are stacked.

In the cell stack of the fuel cell of the present disclosure, the first band engagement portion may protrude from one end of the fastener band in one direction of the direction in which the cells are stacked. The second band engagement portion may protrude from the other end of the fastener band in the other direction of the direction in which the cells are stacked, the other direction being opposite to the one direction. The first band engagement portion and the second band engagement portion may be provided such that the first insertion hole of the first band engagement portion and the second insertion hole of the second band engagement portion extend along a side surface of the cells.

In the cell stack of the fuel cell of the present disclosure, the second band engagement portion may be provided such that the second band engagement portion and the first band engagement portion are arranged in a direction perpendicular to the direction in which the cells are stacked and parallel to the pair of side surfaces of the cell stack structure. The first band engagement portion and the second band engagement portion may be provided such that the first and second insertion holes are arranged in the direction which is perpendicular to the direction in which the cells are stacked and is parallel to the pair of side surfaces of the cell stack structure.

In the cell stack of the fuel cell of the present disclosure, the engagement pin may have a peripheral surface having a circular-arc portion. The circular-arc portion of the engagement pin may be engaged with an inner surface of the first band engagement portion which is formed by the first insertion hole and an inner surface of the insertion hole of the second band engagement portion which is formed by the second insertion hole.

In the cell stack of the fuel cell of the present disclosure, each of the first band engagement portion and the second band engagement portion may have, at both end portions of the fastener band, respectively, a long axis extending in the direction in which the cells are stacked and a short axis extending in a direction perpendicular to the long axis, and the long axis has a length which is not smaller than a length which is twice as large as a length of the short axis.

In the cell stack of the fuel cell of the present disclosure, the first band engagement portion and the second band engagement portion may be deformed by a load applied to fasten the cell stack of the fuel cell.

In the cell stack of the fuel cell of the present disclosure, the first band engagement portion and the second band engagement portion may be provided so as not to overlap with each other when viewed from the direction in which the cells are stacked.

In the cell stack of the fuel cell of the present disclosure, the first band engagement portion and the second band engagement portion may be provided so as to overlap with each other when viewed from the direction perpendicular to the direction in which the cells are stacked.

In the cell stack of the fuel cell of the present disclosure, the first fastener band may include a first band member and a second band member. The first band member may have a first band member engagement portion at one end portion thereof and a second band member engagement portion at the other end portion thereof. The second band member may have a third band member engagement portion at one end portion thereof and a fourth band member engagement portion at the other end portion thereof. Alternatively, the first band engagement portion may include the first band member engagement portion and the third band member engagement portion, and the second band engagement portion may include the second band member engagement portion and the fourth band member engagement portion. The first band member engagement portion and the fourth band member engagement portion may be directly or indirectly engaged with each other, and the second band member engagement portion and the third band member engagement portion are directly or indirectly engaged with each other, to cause the cell stack body to be fastened by the fastener band.

In the cell stack of the fuel cell of the present disclosure, the first band member and the second band member may be configured such that the ends thereof are located at centers of the side surfaces of the cell stack body, respectively.

In the cell stack of the fuel cell of the present disclosure, the fastener band may be provided with a hole into which a pipe is inserted to supply or discharge a fluid flowing in the cell stack body.

A method of fastening a cell stack of a fuel cell of the present disclosure comprises: a step (A) for forming a cell stack body including a cell stack structure including plural cells stacked; an elastic member disposed at an end of the cell stack structure in a direction in which the cells are stacked; and a pair of end plates sandwiching the cell stack structure and the elastic member, and disposing a fastener band so as to surround the cell stack body and so as to cover a pair of end surfaces and a pair of opposing side surfaces of the cell stack body, the fastener band having a first band engagement portion and a second band engagement portion; and a step (B) for directly or indirectly engaging the first band engagement portion and the second band engagement portion with each other to fasten the cell stack body by using the fastener band.

In such a configuration, the cell stack of the fuel cell can be assembled with fewer components and fewer steps without degrading performance of the cell stack in its assembled state.

In the method of fastening the cell stack of the fuel cell of the present disclosure, the step (B) may include: a step (B1) for applying a predetermined load which is larger than a fastening load to portions of the fastener band which cover the pair of end surfaces of the cell stack body, using a presser unit, and inserting the engagement pin into a first insertion hole of the first band engagement portion and a second insertion hole of the second band engagement portion; and a step (B2) for releasing the load applied by the presser unit to engage the engagement pin with an inner surface of the first band engagement portion formed by the first insertion hole, and an inner surface of the second band engagement portion formed by the second insertion hole.

In such a configuration, the cell stack of the fuel cell can be assembled with fewer components and fewer steps without degrading performance of the cell stack in its assembled state.

The above and further objects, features and advantages of the disclosure will more fully apparent from the following detailed description with reference to the accompanying drawings.

DETAILED DESCRIPTION OF THE PREFERRED EMBODIMENTS

Figure 1:
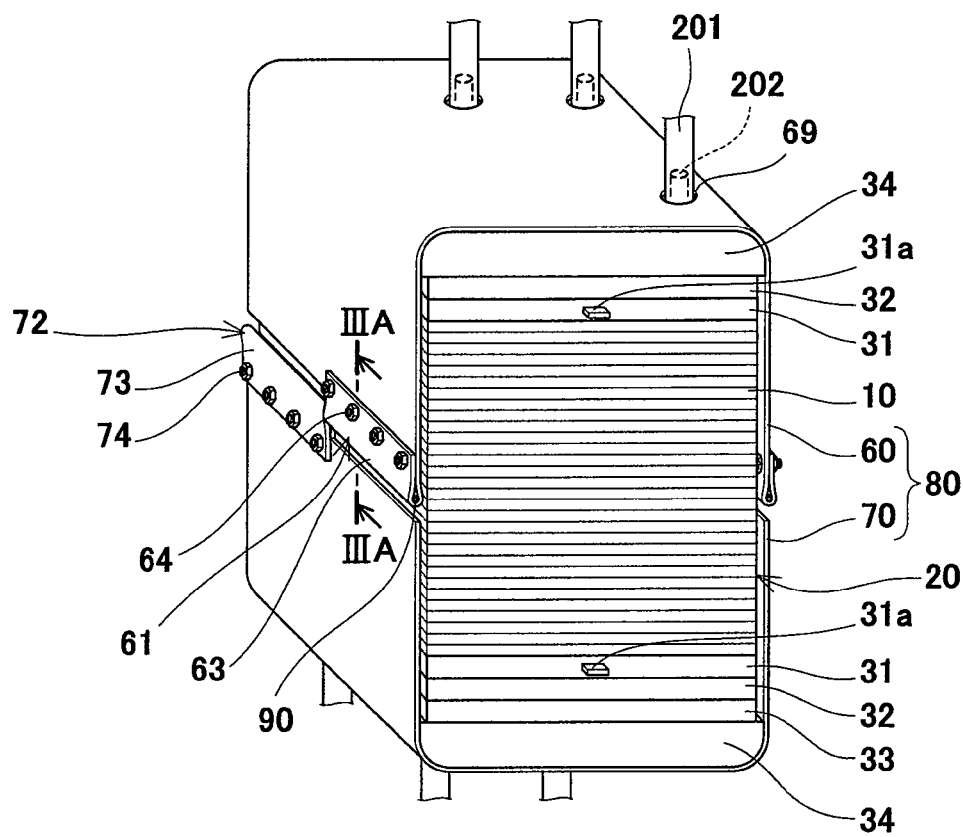
FIG. 1 is a perspective view schematically showing an exemplary configuration of a cell stack of a fuel cell according to Embodiment 1 of the present disclosure.

Hereinafter, preferred embodiments of the present disclosure will be described with reference to the drawings. Throughout the drawings, the same or corresponding components and members are designated by the same reference numerals and repetitive description thereof will be omitted. In the embodiments described below, the present disclosure is applied to a polymer electrolyte fuel cell (PEFC) but is widely applicable to other kinds of fuel cells such as, but not limited to, solid oxide fuel cell (SOFC) or phosphoric acid fuel cell (PAFC).

Embodiment 1

Configuration of a Cell Stack of a Fuel Cell

Figure 2:
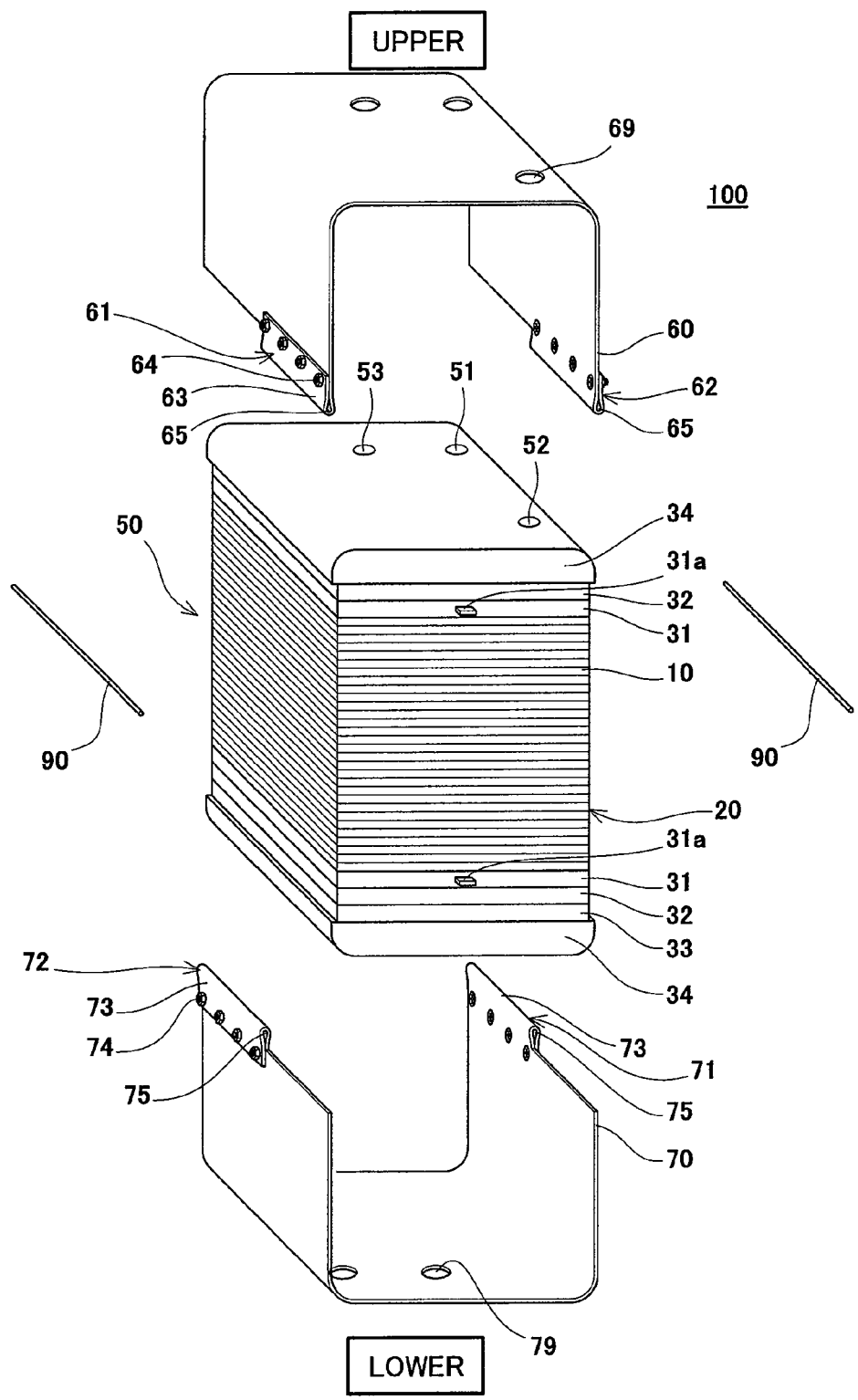
FIG. 2 is an exploded schematic view of the cell stack of the fuel cell of FIG. 1.

FIG. 1 is a perspective view schematically showing a configuration of a cell stack of a fuel cell according to Embodiment 1 of the present disclosure. FIG. 2 is an exploded schematic view of the cell stack of the fuel cell of FIG. 1. In FIGS. 1 and 2, the upper and lower sides of the cell stack of the fuel cell are expressed as the upper and lower sides in these Figures.

As shown in FIGS. 1 and 2, a cell stack 100 of a fuel cell includes a cell stack body 50 having a rectangular parallelepiped configuration, a fastener band 80 including a first U-shaped band member 60 and a second U-shaped band member 70, and a pair of engagement pins 90. The first band member 60 and the second band member 70 extend so as to surround the cell stack body 50 and so as to cover the upper surface (upper end surface) of the cell stack body 50, the lower surface (lower end surface) of the cell stack body 50, and a pair of opposing side surfaces of the cell stack body 50. The first band member 60 has plural (in this embodiment, three) through-holes 69 on a top surface thereof covering the upper surface of the cell stack body 50. The second band member 70 has plural (in this embodiment, three) through-holes 79 on a bottom surface thereof covering the lower surface of the cell stack body 50. Pipes 201 used for supplying to or discharging from the cell stack 100 (cell stack body 50) of the fuel cell, a fluid such as a fuel gas flowing in the cell stack body 50, are respectively inserted into the through-holes 69 and 79.

A first tubular band member engagement portion 61 and a second tubular band member engagement portion 62 are provided at both ends of the first member 60, respectively. Likewise, a third tubular band member engagement portion 71 and a fourth tubular band member engagement portion 72 are provided at both ends of the second band member 70, respectively.

One of the pair of the engagement pins 90 is inserted into the first band member engagement portion 61 of the first band member 60 and the fourth band member engagement portion 72 of the second band member 70. In the same manner, the other engagement pin 90 is inserted into the second band member engagement portion 62 of the first band member 60 and the third band member engagement portion 71 of the second band member 70. Thereby, the first band member engagement portion 61 of the first band member 60 and the fourth band member engagement portion 72 of the second band member 70 are engageable with each other via the engagement pin 90, while the second band member engagement portion 62 of the first band member 60 and the third band member engagement portion 71 of the second band member 70 are engageable with each other via the engagement pin 90. In other words, the first band member engagement portion 61 of the first band member 60 and the fourth band member engagement portion 72 of the second band member 70 are indirectly engageable with each other via the engagement pin 90, while the second band member engagement portion 62 of the first band member 60 and the third band member engagement portion 71 of the second band member 70 are indirectly engageable with each other via the engagement pin 90. Thus, when the engagement pins 90 are inserted, the first band member 60 and the second band member 70 are secured together.

The first band member 60 and the second band member 70 are made of a material which is excellent in tensile strength and anticorrosion, such as, but not limited to, resin (engineering plastic, elastomer, etc), stainless steel (e.g., SUS304), or chrome molybdenum steel. The engagement pins 90 are made of a material such as, but not limited to, chrome molybdenum steel, or stainless steel (e.g., SUS304).

Figure 3A:
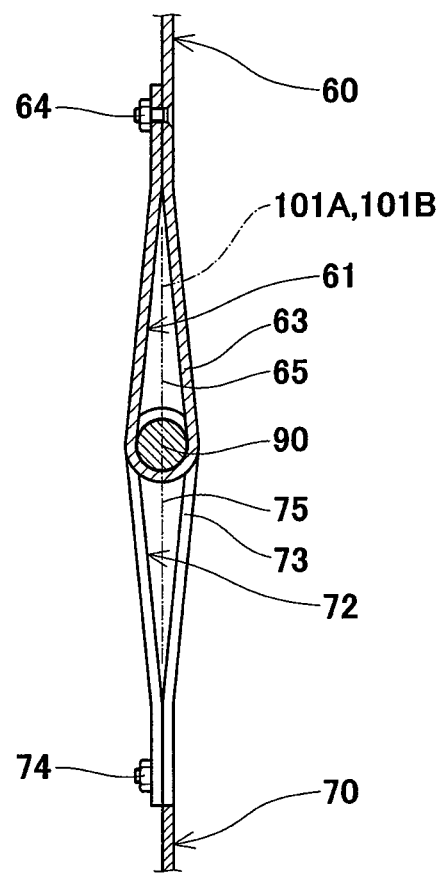
FIG. 3A is a cross-sectional view taken along line IIIA-IIIA of FIG. 1.
Figure 3B:
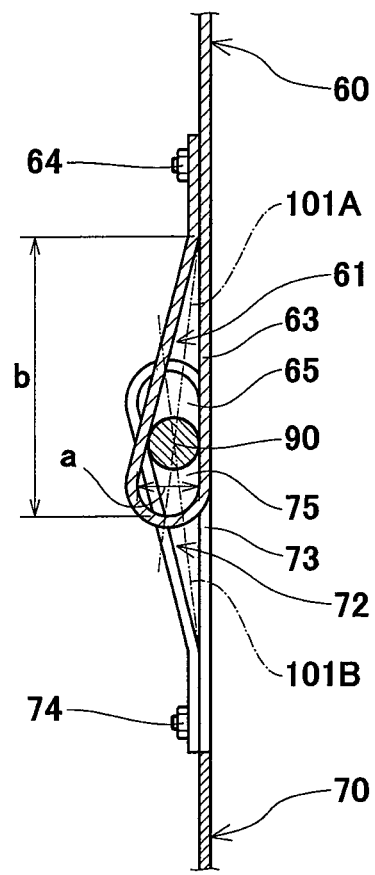
FIG. 3B is a schematic view showing a state where the cell stack of the fuel cell is assembled (fastened).

With reference to FIGS. 3A and 3B, the structures of the first band member engagement portion 61 and the second band member engagement portion 62 of the first band member 60 and the third band member engagement portion 71 and the fourth band member engagement portion 72 of the second band member 70 will be described in greater detail. Since the first band member engagement portion 61 and the second band member engagement portion 62 of the first band member 60 have the same structure, and the third band member engagement portion 71 and the fourth band member engagement portion 72 of the second band member 70 have the same structure, the first band member engagement portion 61 of the first band member 60 and the fourth band member engagement portion 72 of the second band member 70 will be described hereinafter.

FIG. 3A is a cross-sectional view taken along line IIIA-IIIA of FIG. 1. FIG. 3B is a schematic view showing a state where the cell stack 100 of the fuel cell is assembled (fastened). In FIGS. 3A and 3B, to clearly distinguish between the first band member engagement portion 61 of the first and member 60 and the fourth band member engagement portion 72 of the second band member 70, the first band member engagement portion 61 is hatched.

As shown in FIGS. 1 to 3B, an engagement portion forming section 63 and an engagement portion forming section 73 are provided at the end of the first band member 60 and at the end of the second band member 70, respectively so as to protrude along the surfaces (in a vertical direction) of the first and second band members 60 and 70. The engagement portion forming sections 63 and 73 form the first band member engagement portion 61, the second band member engagement portion 62, the third band member engagement portion 71 and the fourth band member engagement portion 72. The engagement portion forming sections 63 and 73 are each folded back to form a tubular shape. The tip end portion of the engagement portion forming section 63 and the base end portion of the engagement portion forming section 63 are welded and fastened to each other by screws 64, while the tip end portion of the engagement portion forming section 73 and the base end portion of the engagement portion forming section 73 are welded and fastened to each other by screws 74.

To be specific, the first band member engagement portion 61 protrudes from one end of the first band member 60 in one direction (in this embodiment, downward) in a direction in which cells 10 are stacked, and the second band member engagement portion 62 protrudes downward from the other end of the first band member 60. In the same manner, the third band member engagement portion 71 protrudes from one end of the second band member 70 in the other direction (in this embodiment, upward) in the direction in which cells 10 are stacked, and the fourth band member engagement portion 72 protrudes upward from the other end of the second band member 70. In other words, the third band member engagement portion 71 is disposed such that the third band member engagement portion 71 and the second band member engagement portion 62 are aligned when viewed from a direction which is perpendicular to the direction in which the cells 10 are stacked and extend parallel to a pair of side surfaces of the cell stack structure 20. Likewise, the fourth band member engagement portion 72 is disposed such that the fourth band member engagement portion 72 and the first band member engagement portion 61 are aligned when viewed from the direction which is perpendicular to the direction in which the cells 10 are stacked and extend parallel to the pair of side surfaces of the cell stack structure 20. As used herein, the phrase "the direction which is perpendicular to the direction in which the cells 10 are stacked and extend parallel to the pair of side surfaces of the cell stack structure 20" means a direction in which a long side of the side surface of the cells 10 which is covered with the first band member 60 or the second band member 70 extends (hereinafter referred to as the direction in which the long side of the side surface of the cells 10 extends).

The first band member engagement portion 61 and the second band member engagement portion 62 having the above structure are provided with insertion holes (tubular inner spaces) 65, respectively extending in the direction perpendicular to the direction (in this embodiment, vertical direction) in which the cells 10 are stacked. In the same manner, the third band member engagement portion 71 and the fourth band member engagement portion 72 are provided with insertion holes (tubular inner spaces) 75, respectively extending in the direction perpendicular to the direction (in this embodiment, vertical direction) in which the cells 10 are stacked.

To be specific, the insertion holes 65 and the insertion holes 75 extend along the side surface of the cells 10 (to be precise, the long side of the side surface of the cells 10). The insertion hole 65 of the first band member engagement portion 61 and the insertion hole 75 of the fourth band member engagement portion 72 are arranged in the direction perpendicular to the direction in which the cells 10 are stacked. In the same manner, the insertion hole 65 of the second band member engagement portion 62 and the insertion hole 75 of the third band member engagement portion 71 are arranged in the direction perpendicular to the direction in which the cells 10 are stacked. To be more specific, the insertion hole 65 of the first band member engagement portion 61 and the insertion hole 75 of the fourth band member engagement portion 72 are arranged in the direction which is perpendicular to the direction in which the cells 10 are stacked and is parallel to the pair of side surfaces of the cell stack structure 20. In the same manner, the insertion hole 65 of the second band member engagement portion 62 and the insertion hole 75 of the third band member engagement portion 71 are arranged in the direction which is perpendicular to the direction in which the cells 10 are stacked and is parallel to the pair of side surfaces of the cell stack structure 20.

In other words, the insertion hole 65 of the first band member engagement portion 61 and the insertion hole 75 of the fourth band member engagement portion 72 are arranged so as to overlap or align with each other when viewed from the direction of the long side of the side surface of the cells 10. The insertion hole 65 of the second band member engagement portion 62 and the insertion hole 75 of the third band member engagement portion 71 are arranged so as to overlap or align with each other when viewed from the direction of the long side of the side surface of the cells 10. As used herein, the phrase "the insertion hole 65 and the insertion hole 75 are arranged in the direction perpendicular to the direction in which the cells 10 are stacked or arranged in the direction which is perpendicular to the direction in which the cells 10 are stacked and is parallel to the pair of side surfaces of the cell stack structure 20" is meant to include that a part of the insertion hole 65 overlaps a part of the insertion hole 75 when viewed from the direction in which the long side of the side surface of the cells 10 covered with the first band member 60 or the second band member 70 extends, as well as that the insertion hole 65 and the insertion hole 75 are arranged so as to overlap or align with each other, when viewed from the direction in which the long side of the side surface of the cells 10 covered with the first band member 60 or the second band member 70 extends.

The first band member engagement portion 61 and the third band member engagement portion 71 form a first band engagement portion, while the second band member engagement portion 62 and the fourth band member engagement portion 72 form a second band engagement portion. The insertion hole 65 of the first band member engagement portion 61 and the insertion hole 75 of the third band member engagement portion 71 form a first insertion hole, while the insertion hole 65 of the second band member engagement portion 62 and the insertion hole 75 of the fourth band member engagement portion 72 form a second insertion hole.

In Embodiment 1, the first band member engagement portion 61 of the first band member 60 is formed so as to overlap the second band member engagement portion 62 of the first band member 60, when viewed from the direction which is perpendicular to the direction in which the cells 10 are stacked. In the same manner, the third band member engagement portion 71 of the second band member 70 is formed so as to overlap the fourth band member engagement portion 72 of the second band member 70, when viewed from the direction which is perpendicular to the direction in which the cells 10 are stacked. In other words, the first band member engagement portion 61 of the first band member 60 and the second band member engagement portion 62 of the first band member 60 are formed symmetrically with respect to the cell stack body 50 sandwiched therebetween. In the same manner, the third band member engagement portion 71 of the second band member 70 and the fourth band member engagement portion 72 of the second band member 70 are formed symmetrically with respect to the cell stack body 50 sandwiched therebetween. In this embodiment, the first member engagement portion 61 of the first band member 60 and the fourth band member engagement portion 72 of the second member 70 are arranged at substantially the center of the side surface of the cell stack structure 20, and the second member engagement portion 62 of the first band member 60 and the third band member engagement portion 71 of the second band member 70 are arranged at substantially the center of the side surface of the cell stack structure 20.

The first band member engagement portion 61 of the first band member 60 and the fourth band member engagement portion 72 of the second band member 60 are formed not to overlap, when viewed from the direction in which the cells 10 are stacked, and the second band member engagement portion 62 of the first band member 60 and the third band member engagement portion 71 of the second band member 70 are formed not to overlap, when viewed from the direction in which the cells 10 are stacked.

The width of the first band member 60 and the width of the second band member 70 are desirably larger than the width for covering power generation sections (cathode and anode electrode sections) of the cells 10. This makes it possible to evenly press the power generation sections of the cells 10. In addition, the width of the first band member 60 and the width of the second band member 70 are desirably equal to or larger than the width of the end plates 34 as described later. This makes it possible to cover the entire end surfaces of the end plates 34 and evenly press the same. Thereby, stiffness of the end plate 34 need not be high and the material may be selected flexibly.

As shown in FIG. 3B, the first band member engagement portion 61 of the first band member 60 and the fourth band member engagement portion 72 of the second band member 70 are formed such that a length b in a long axis direction (direction in which the cells 10 are stacked) is not less than twice as large as a length a in a short axis direction (thickness direction of the first band member 60 and the second band member 70), when viewed from the thickness direction of the first band member 60 and the second band member 70. In this structure, the engagement pin 90 can be easily inserted into the first band member engagement portion 61 of the first band member 60 and the fourth band member engagement portion 72 of the second band member 70.

The engagement pin 90 is inserted into the first band member engagement portion 61 of the first band member 60 and the fourth band member engagement portion 72 of the second band member 70 such that the inner surface of the first band member engagement portion 61 and the inner surface of the fourth band member engagement portion 72 are engaged with the peripheral surface of the engagement pin 90. To be specific, the half of the peripheral surface of the engagement pin 90 is configured to contact each of the inner surface of the first band member engagement portion 61 and the inner surface of the fourth band member engagement portion 71.

In this state, the engagement pin 90, the first band member engagement portion 61 and the fourth band member engagement portion 72 are applied with a force from all directions and thereby fixed, increasing a force against a vibration or an impact applied from outside. Unlike the conventional method in which the cell stack body 50 is fastened using the bolts and the nuts, a large protruding portion is unnecessary. This reduces a space in which the cell stack 100 of the fuel cell is installed or the surface area of the cell stack 100. By reducing the surface area of the cell stack 100 of the fuel cell, the heat radiation amount of the cell stack 100 can be reduced. Thus, the cell stack 100 can be used as an electric power supply of a cogeneration system which has a high heat recovery property.

In the cell stack 100 of the conventional fuel cell, a contact resistance between adjacent cells 10 and a contact resistance between the separator and the MEA forming the cell 10 increase due to a large or small fastening load, an uneven fastening load, etc, which may sometimes result in degraded cell performance. In the structure for fastening the band engagement portion with the nuts and the bolts, in the polymer electrolyte fuel cell disclosed in Patent document 2, for example, there is a distance between a surface (band) generating a tension and a fulcrum point (engagement portion). For this reason, there is a chance that the engagement portion is deformed due to the tension of the band. The extent of such deformation depends greatly on a variation in stiffness of the engagement portion, a variation in the tension of the band, etc. As a result, the polymer electrolyte fuel cell disclosed in Patent document 2 is incapable of obtaining a stable fastening load.

In contrast, in the cell stack 100 of the fuel cell of Embodiment 1, as shown in FIG. 3A, the fulcrum point (engagement pin 90) is positioned on the surface generating a tension (surface including the center lines 101A and 101B and being perpendicular to the stacking direction) so that the deformation of the engagement portion forming sections 63 and 73 is suppressed. Since the surface generating a tension and the fulcrum point are located on substantially the same plane, the cell stack 100 of the fuel cell can substantially suppress variations in the fastening load due to the deformation.

Although the tip end portion and the base end portion of the engagement portion forming section 63 are welded and fastened to each other using the screws 64 and the tip end portion and the base end portion of the engagement portion forming section 73 are welded and fastened to each other using the screws 74, they may alternatively be joined to each other only by welding, only by the screws or by the bonding agent, so long as the engagement portion forming section 63 and the engagement portion forming section 73 are able to have a stiffness sufficient to withstand a fastening pressure. Although the engagement pin 90 has a circular cross-section, its shape is not so limited provided that its peripheral surface has a circular-arc portion. For example, the engagement pin 90 may have a cross-section of an oval shape or an elongate-circle shape.

Next, the components of the cell stack 100 of the fuel cell of Embodiment 1 will be described with reference to FIG. 2.

The cell stack body 50 includes a cell stack structure 20 including plural plate-shaped cells (unit cells) 10 which are stacked, a pair of current collectors 31, a pair of insulating plates 32, an elastic member 33, and a pair of end plates 34 sandwiching these members therebetween. The cell stack body 50 has a fuel gas supply manifold 51, a fuel gas exhaust manifold (not shown), an oxidizing gas supply manifold 52, an oxidizing gas exhaust manifold (not shown), a cooling medium supply manifold 53, and a cooling medium discharge manifold (not shown), which are formed to penetrate through the cell stack body 50. Each manifold is provided with a connecting member 202 for connecting the pipe 201 to the cell stack body 50 (cell stack 100 of the fuel cell).

Each cell 10 includes a MEA (membrane-electrode-assembly) consisting of a polymer electrolyte membrane, an anode and cathode disposed on both surfaces thereof, gaskets, and a pair of separators. By contact between the separators of adjacent cells 10, all of the cells 10 are electrically connected in series. By stacking the cells 10 having the above structure in a thickness direction thereof, the cell stack structure 20 is formed.

The pair of current collectors 31 are disposed at the both ends of the cell stack structure 20 in the direction in which the cells 10 are stacked. Terminal members 31a are provided on the side surfaces of the current collectors 31. Electric wires (not shown) are connected to the terminal members 31a. Thus, an electric power generated in the respective cells 10 can be output to outside through the terminal members 31a. It is sufficient that the current collectors 31 are made of a material which is gas-impermeable and electrically conductive. The current collectors 31 may be made of dense carbon or metal such as, for example, copper.

The pair of insulating plates 32 are disposed outside the current collectors 31 of the cell stack structure 20 such that they are respectively in contact with the main surfaces of the current collectors 31. In other words, the pair of insulating plates 32 sandwich and retain a stack of the cell stack structure 20 and the current collectors 31. The insulating plates 32 may be made of an insulating material such as rubber or plastic.

The plate-shaped elastic member 33 is disposed under the insulating plate 32 located at the lower side of the pair of insulating plates 32. The elastic member 33 serves to apply a pressing force in the stacking direction to the stack including the cell stack structure 20, the current collectors 31, and others. By the elastic force of the elastic member 33, a fastening pressure is applied to the fastener band 80. In this embodiment, as the elastic member 33, a sheet made of rubber such as fluorine-containing rubber or EPDM may be utilized.

The pair of end plates 34 are disposed at the both ends of the stack including the cell stack structure 20, the current collectors 31, and others such that they are in contact with the main surface of the insulating plate 32 or the main surface of the elastic member 33. The end plates 34 serve to apply the fastening force of the fastener band 80 to the cell stack structure 20, the current collectors 31, and others with an even surface pressure. The end plates 34 are formed using a stiff material such as, hard plastic or steel, to prevent deformation due to the fastening structure. As shown in FIGS. 1 and 2, the size of the main surfaces of the end plates 34 is preferably set slightly larger than the size of the cells 10, the main surfaces of the current collectors 31, and others. The pair of sides of the main surfaces of the end plates 34, which are in contact with the fastener band 80, are preferably chamfered so that the chamfered portions have a smaller thickness than the center portions.

Thus, the fastener band 80 extends between the pair of end plates 34 to be apart from the side surfaces (i.e., not in contact) of the cell stack structure 20 and the current collectors 31. This makes it possible to prevent a short circuit between the cell stack structure 20 and the current collectors 31 which would otherwise occur because of the fastener band 80. In addition, this makes it possible to prevent the fastening pressure from the fastener band 80 being applied unevenly with respect to the main surfaces of the end plates 3. As a result, the anode and the cathode forming the MEA of each cell 10 can contact the polymer electrolyte membrane of the MEA with an even surface pressure.

Next, a fastening method of the cell stack 100 of the fuel cell of Embodiment 1 will be described with reference to FIGS. 1 to 3.

[Fastening Method of Cell Stack of Fuel Cell]

Initially, the end plate 34 is placed on the bottom surface of the second band member 70 having a U-shape, and the elastic member 33, the insulating plate 32 and the current collector 31 are placed thereon. Then, the plural cells 10 are stacked on the main surface of the current collector 31, forming the cell stack structure 20. Then, on the main surface of the cell 10 of the cell stack structure 20, the current collector 31, the insulating plate 32 and the end plate 34 are placed, and the first band member 60 having a U-shape is placed so as to cover the main surface of the end plate 34. That is, the cell stack body 50 is formed, and the first band member 60 and second band member 70 are placed so as to surround the periphery of the cell stack body 50 and so as to cover a pair of end surfaces of the cell stack body 50 (main surfaces of the end plates 34) and a pair of opposing side surfaces of the cell stack body 50.

Then, using a presser unit (e.g., flat press machine), the first band member 60, the cell stack body 50, and the second band member 70 are pressed together so as to have a specified dimension in the stacking direction. Then, the pair of engagement pins 90 are inserted into the first band member engagement portion 61 of the first band member 60 and the fourth band member engagement portion 72 of the second band member 70, and into the second band member engagement portion 62 of the first band member 60 and the third band member engagement portion 71 of the second band member 70 (see FIG. 3B). To be specific, using the presser unit, a predetermined load which is larger than the fastening load of the cell stack 100 of the fuel cell, is applied to the portions of the first band member 60 and the second band member 70, which cover the pair of end surfaces (main surfaces of the end plates 34) of the cell stack body 50. Then, the engagement pin 90 is inserted into the insertion hole 65 of the first band member engagement portion 61 and into the insertion hole 75 of the fourth band member engagement portion 72, and the engagement pin 90 is inserted into the insertion hole 65 of the second band member engagement portion 62 and into the insertion hole 75 of the third band member engagement portion 71.

Then, releasing the pressing force of the presser unit, the first band member 60 and the second band member 70 are pushed in the direction in which the cells 10 are stacked by the elastic force of the elastic member 33 to cause the first band member engagement portion 61 and the fourth band member engagement portion 72 to be deformed by a tensile force to cause the center line 101A to be oriented in the direction (i.e., vertical direction) along the center line of the first band member 60 and adhere to the engagement pin 90, and to cause the second band member engagement portion 62 and the third band member engagement portion 71 to be deformed by a tensile force to cause the center line 101B to be oriented in the direction (i.e., vertical direction) along the center line of the second band member 70 and adhere to the engagement pin 90. Thus, the cell stack 100 of the fuel cell is fastened (see FIG. 3A). To be specific, by releasing the pressing load of the presser unit, the engagement pin 90 is engaged with the inner surface of the insertion hole 65 of the first band member engagement portion 61 and the inner surface of the insertion hole 75 of the fourth band member engagement portion 72, and the engagement pin 90 is engaged with the inner surface of the insertion hole 65 of the second band member engagement portion 62 and the inner surface of the insertion hole 75 of the third band member engagement portion 71, causing the first band member 60 and the second band member 70 to be indirectly engaged with each other via the engagement pins 90. In this manner, the cell stack body 50 is fastened by the fastener band 80.

Next, the advantage of the cell stack 100 of the fuel cell according to Embodiment 1 will be described with reference to FIG. 1 to FIG. 3B.

[Advantage of Cell Stack of Fuel Cell]

As described above, in the cell stack 100 of the fuel cell according to Embodiment 1, by inserting the engagement pin 90 into the first band member engagement portion 61 of the first band member 60 and the fourth band member engagement portion 72 of the second band member 70, and by inserting the engagement pin 90 into the second band member engagement portion 62 of the first band member 60 and the third band member engagement portion 71 of the second band member 70, the cell stack 100 of the fuel cell can be fastened. Thus, assembling of the cell stack 100 is accomplished with fewer components and fewer steps. Unlike the method using the bolts and the nuts, what is needed is to provide at the side surfaces of the cell stack 100 of the fuel cell, the first band member engagement portion 61 and the third band member engagement portion 71 forming the first band engagement portion and the second band member engagement portion 62 and the fourth band member engagement portion 72 forming the second band engagement portion. Therefore, the cell stack 100 of the fuel cell can be made compact. In addition, the surface area of the cell stack 100 of the fuel cell can be reduced, and its heat radiation amount can be reduced.

Since the length b of the first band member engagement portion 61, the second band member engagement portion 62, the third band member engagement portion 71 and the fourth band member engagement portion 72 in the long axis direction is set to a length which is not less than twice as large as the length a in the short axis direction, it is possible to ensure a sufficient clearance required to insert the engagement pin 90. As a result, the cell stack 100 of the fuel cell can be easily assembled.

Since the engagement pins 90 are inserted in the direction perpendicular to the direction in which the fastening load is applied to the cell stack 100 and the cells 10 are stacked, it is possible to avoid that the engagement pins 90 are disengaged due to a vibration or an impact. Furthermore, since the first band member engagement portion 61, the second band member engagement portion 62, the third band member engagement portion 71 and the fourth band member engagement portion 72 are deformed when fastening the cell stack 100 of the fuel cell, the inner surfaces of these engagement portions adhere to and are fixed to the peripheral surfaces of the engagement pins 90. As a result, vibration proof property and impact resistance of the cell stack 100 of the fuel cell are improved.

Since the first band member engagement portion 61, the second band member engagement portion 62, the third band member engagement portion 71 and the fourth band member engagement portion 72 are located at substantially the centers of the side surfaces of the cell stack structure 20 (cell stack body 50), it is possible to suppress external forces such as a vibration and an impact concentrating in a localized region.

Figure 4:
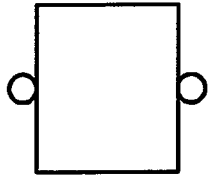
FIG. 4 is a table showing a result of simulation conducted to determine whether or not a local stress is generated in an end plate or the like, depending on the positions at which a first band engagement portion and a second band engagement portion are provided, in the cell stack of the fuel cell.
Figure 4:
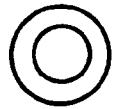
Figure 4:
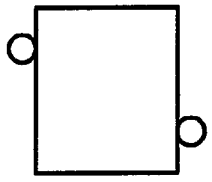

FIG. 4 is a table showing the result of simulations conducted to research whether or not a local stress is generated on the end plates 34 and the like depending on the positions of the first band engagement portion and the second band engagement portion in the cell stack 100 of the fuel cell.

As shown in FIG. 4, when the first band member engagement portion 61, the second band member engagement portion 62, the third band member engagement portion 71 and the fourth band member engagement portion 72 of the first band member 60 and the second band member 70 were positioned at substantially the centers of the pair of side surfaces of the cell stack body 50 (the first band engagement portion and the second band engagement portion are positioned at substantially the centers of the pair of side surfaces of the cell stack body 50), a local stress was not substantially generated on the end plates 34 and others. When the first band member engagement portion 61 of the first band member 60 and the fourth band member engagement portion 72 of the second band member 70 were positioned at the upper portion (or lower portion) of one of the side surfaces of the cell stack body 50 and the second band member engagement portion 62 of the first band member 60 and the third band member engagement portion 71 of the second band member 70 were positioned at the lower portion (or upper portion) of the other the side surface of the cell stack body 50, a local stress was generated on the end plates 34 or the like but its magnitude was small. When the first band member engagement portion 61, the second band member engagement portion 62, the third band member engagement portion 71 and the fourth band member engagement portion 72 of the first band member 60 and the second band member 70 were positioned at the upper portions (or lower portions) of the pair of side surfaces of the cell stack body 50, a local stress was generated on the end plates 34 or the like.

From the above mentioned result, it was discovered that it is possible to suppress external forces, such as a vibration, and an impact, from concentrating in a localized region, by positioning the first band member engagement portion 61, the second band member engagement portion 62, the third band member engagement portion 71 and the fourth band member engagement portion 72 substantially at the centers of the side surfaces of the cell stack structure 20 (cell stack body 50).

Embodiment 2

Figure 5:
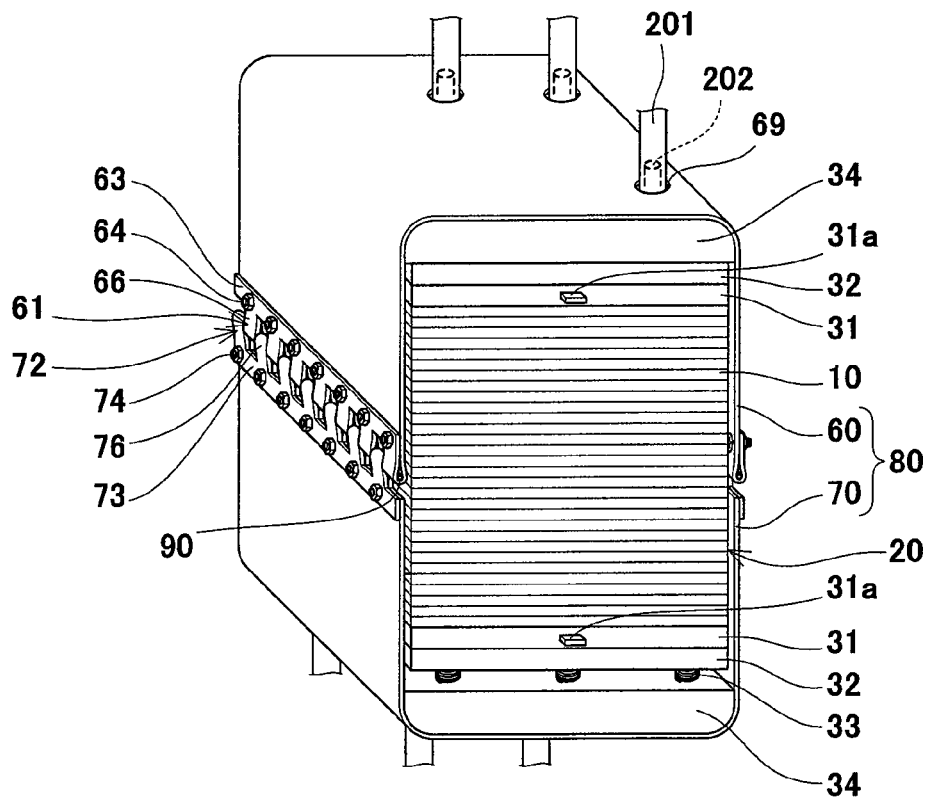
FIG. 5 is a perspective view schematically showing an exemplary configuration of a cell stack of a fuel cell according to Embodiment 2 of the present disclosure.
Figure 6:
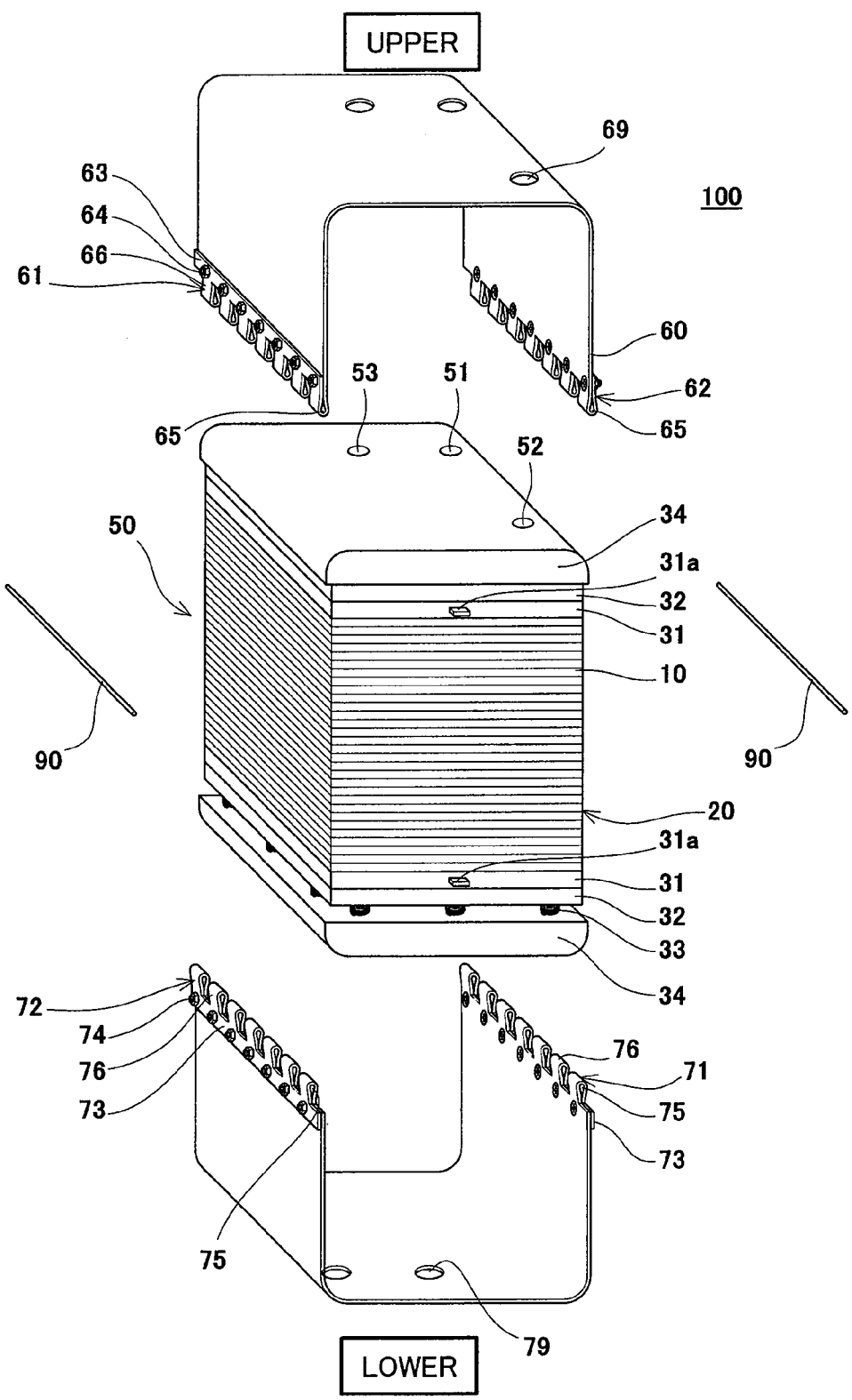
FIG. 6 is an exploded schematic view of the cell stack of the fuel cell of FIG. 5.

FIG. 5 is a perspective view schematically showing an exemplary configuration of a cell stack of a fuel cell according to Embodiment 2 of the present disclosure. FIG. 6 is an exploded schematic view of the cell stack of the fuel cell of FIG. 5. In FIGS. 5 and 6, the upper and lower sides of the cell stack of the fuel cell are expressed as the upper and lower sides in these Figures.

As shown in FIGS. 5 and 6, the cell stack 100 of the fuel cell according to Embodiment 2 of the present disclosure has a structure which is basically identical to that of the cell stack 100 of the fuel cell according to Embodiment 1, except for the structures of the elastic member 33 and the first band member engagement portion 61, the second band member engagement portion 62, the third band member engagement portion 71 and the fourth band member engagement portion 72.

To be specific, in the cell stack 100 of Embodiment 2, the elastic member 33 is formed by compressive springs. In addition, the first band member engagement portion 61, the second band member engagement portion 62, the third band member engagement portion 71 and the fourth band member engagement portion 72 have plural (in this embodiment, seven) engagement units 66 and plural (seven) engagement units 76. The engagement units 66 have a comb shape and the engagement units 76 have a comb shape. The engagement units 66 protrude from the ends of the first band member 60 along the surface thereof (in this embodiment, vertical direction) and the engagement units 76 protrude from the ends of the second band member 70 along the surface thereof (in this embodiment, vertical direction). An insertion hole 65 and an insertion hole 75 are defined by an inner space of the engagement unit 66 and an inner space of the engagement unit 76, respectively.

The engagement units 66 provided at the first band member engagement portion 61 of the first band member 60 and the engagement units 76 provided at the fourth band member engagement portion 72 of the second band member 70 are provided such that they are not in contact with each other. In the same manner, the engagement units 66 provided at the second band member engagement portion 62 of the first band member 60 and the engagement units 76 provided at the third band member engagement portion 71 of the second band member 70 are provided such that they are not in contact with each other.

The cell stack 100 of the fuel cell of Embodiment 2 configured as described above is able to achieve the same advantage as that of the cell stack 100 of the fuel cell of Embodiment 1.

Embodiment 3

Figure 7:
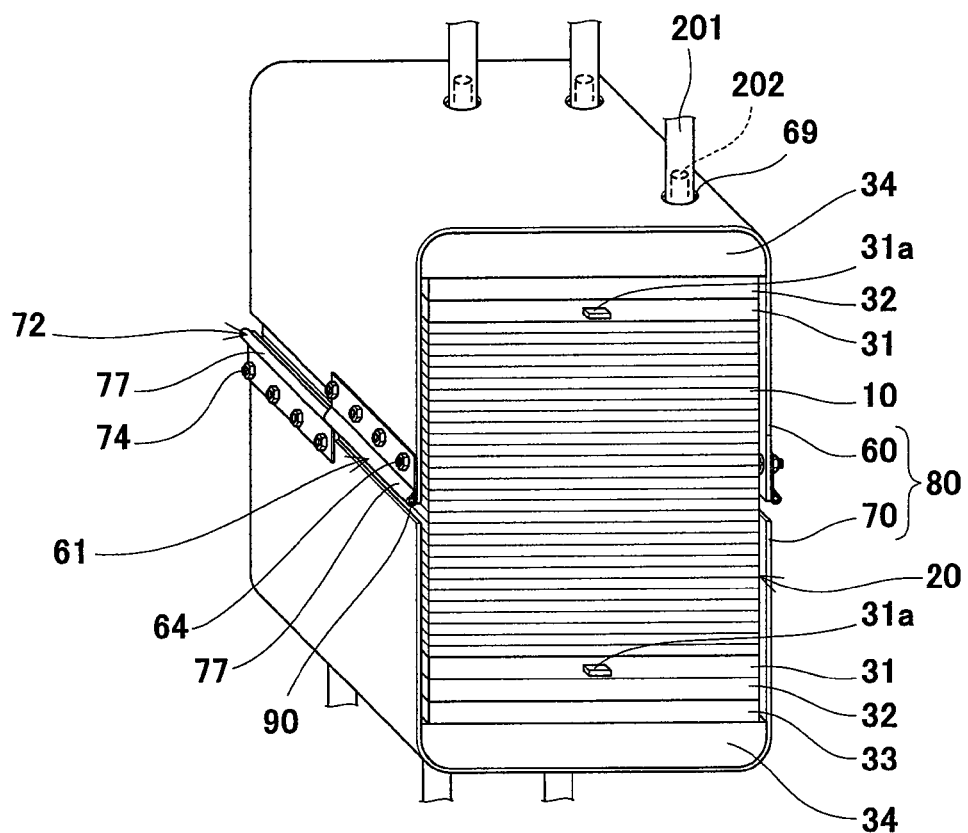
FIG. 7 is a perspective view schematically showing an exemplary configuration of a cell stack of a fuel cell according to Embodiment 3 of the present disclosure.
Figure 8:
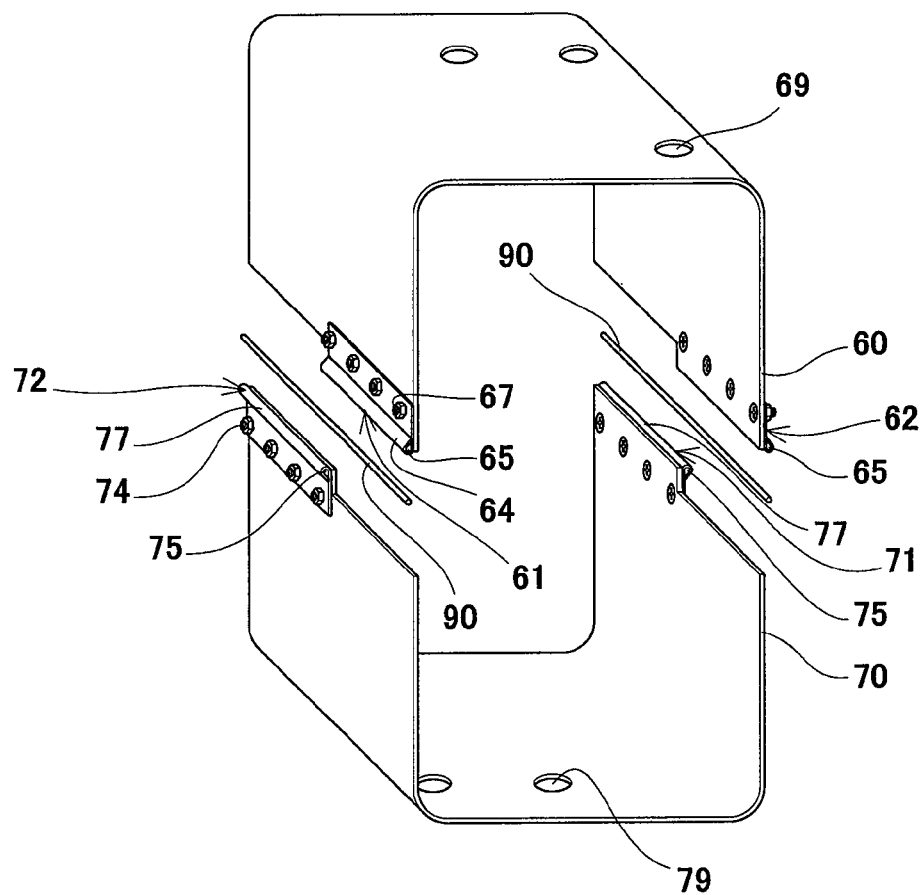
FIG. 8 is a perspective view schematically showing an exemplary configuration of a first band member and a second band member of the cell stack of the fuel cell of FIG. 7.

FIG. 7 is a perspective view schematically showing an exemplary configuration of a cell stack of a fuel cell according to Embodiment 3 of the present disclosure. FIG. 8 is a perspective view schematically showing a configuration of a first band member and a second band member forming the cell stack of the fuel cell of FIG. 7. In FIG. 7, the upper and lower sides of the cell stack of the fuel cell are expressed as the upper and lower sides in these Figures. In FIG. 8, the upper and lower sides of the first band member and the second band member are expressed as the upper and lower sides in these Figures.

As shown in FIGS. 7 and 8, the cell stack 100 of the fuel cell according to Embodiment 3 of the present disclosure has a structure which is basically identical to that of the cell stack 100 of the fuel cell according to Embodiment 1 except that the first band member engagement portion 61, the second band member engagement portion 62, the third band member engagement portion 71 and the fourth band member engagement portion 72 are not formed by the engagement portion forming sections 63 and 73, but by separate members. To be specific, the first band member engagement portion 61, the second band member engagement portion 62, the third band member engagement portion 71 and the fourth band member engagement portion 72 are formed in such a manner that plate members 67 and plate members 77 are folded back to form tubular insertion holes 65 and 75 and one ends thereof are fastened by welding. The plate members 67 are bonded to the first band member 60 using screws 64 and by welding, and the plate members 77 are bonded to the second band member 70 by screws 74 and by welding. The plate members 67 and 77 are desirably made of a material which can withstand a fastening pressure, and may be made of, for example SUS or the like.

The first band member 60 is cut at the portions of the both ends where the plate members 67 are not provided and the second band member 70 is cut at the portions of the both ends where the plate members 77 are not provided, to prevent contact with the first band member engagement portion 61, the second band member engagement portion 62, the third band member engagement portion 71 and the fourth band member engagement portion 72, when fastening the cell stack 100 of the fuel cell.

The cell stack 100 of the fuel cell of Embodiment 3 configured as described above is able to achieve the same advantage as that of the cell stack 100 of the fuel cell of Embodiment 1.

Embodiment 4

Figure 9:
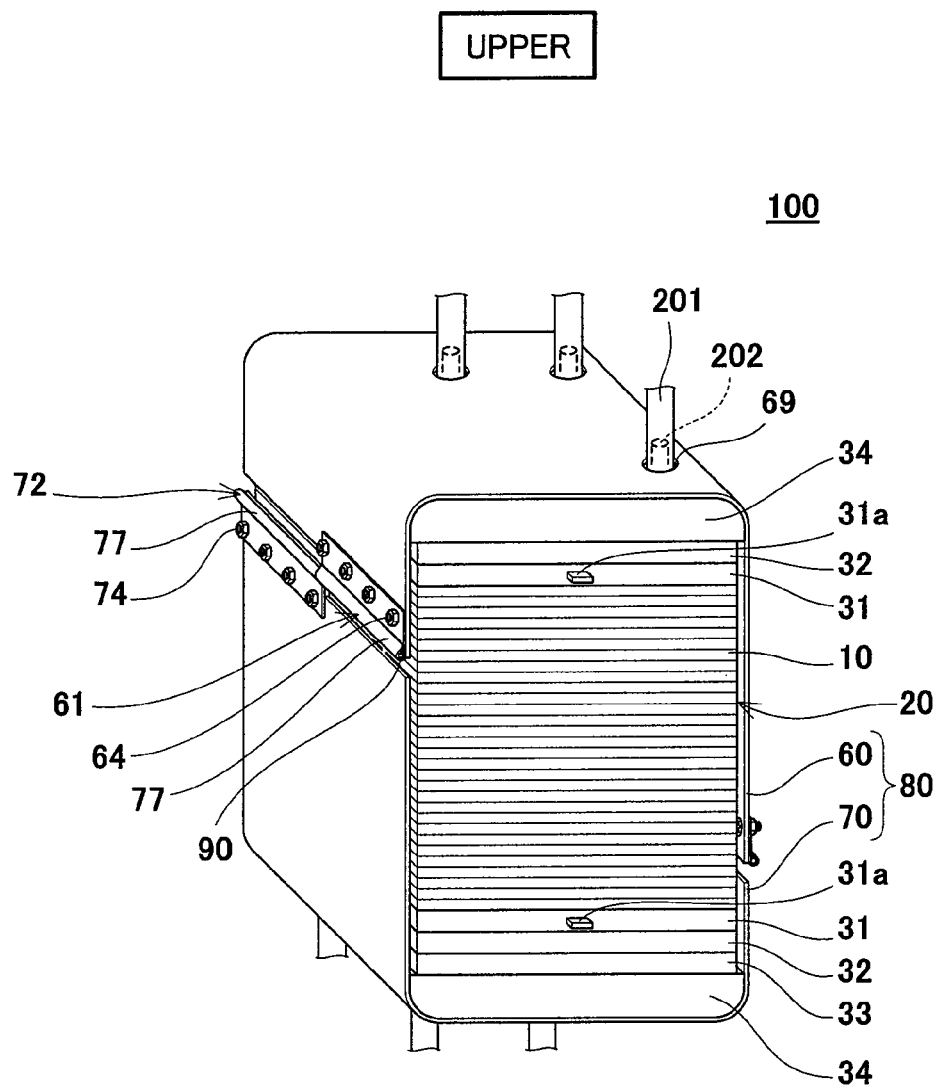
FIG. 9 is a perspective view schematically showing an exemplary configuration of a cell stack of a fuel cell according to Embodiment 4 of the present disclosure.

FIG. 9 is a perspective view schematically showing an exemplary configuration of a cell stack of a fuel cell according to Embodiment 4 of the present disclosure. In FIG. 9, the upper and lower sides of the cell stack of the fuel cell are expressed as the upper and lower sides in the Figure.

As shown in FIG. 9, the cell stack 100 of the fuel cell according to Embodiment 4 of the present disclosure has a structure which is basically identical to that of the cell stack 100 of the fuel cell according to Embodiment 1, except that the first band member engagement portion 61 of the first band member 60 is formed not to overlap the second band member engagement portion 62 of the first band member 60, when viewed from the direction perpendicular to the direction in which the cells 10 are stacked and the third band member engagement portion 71 of the second band member 70 is formed not to overlap the fourth band member engagement portion 72 of the second band member 70, when viewed from the direction perpendicular to the direction in which the cells 10 are stacked.

The first band member engagement portion 61 of the first band member 60 and the fourth band member engagement portion 72 of the second band member 70, and the second band member engagement portion 62 of the first band member 60 and the third band member engagement portion 71 of the second band member 70 are desirably located on the side surfaces of the cell stack structure 20 and not on the side surfaces of the current collectors 31, the insulating plates 32, the elastic member 33, and the end plates 34.

The cell stack 100 of the fuel cell of Embodiment 4 configured as described above is able to achieve the same advantage as that of the cell stack 100 of the fuel cell of Embodiment 1.

Embodiment 5

Figure 10:
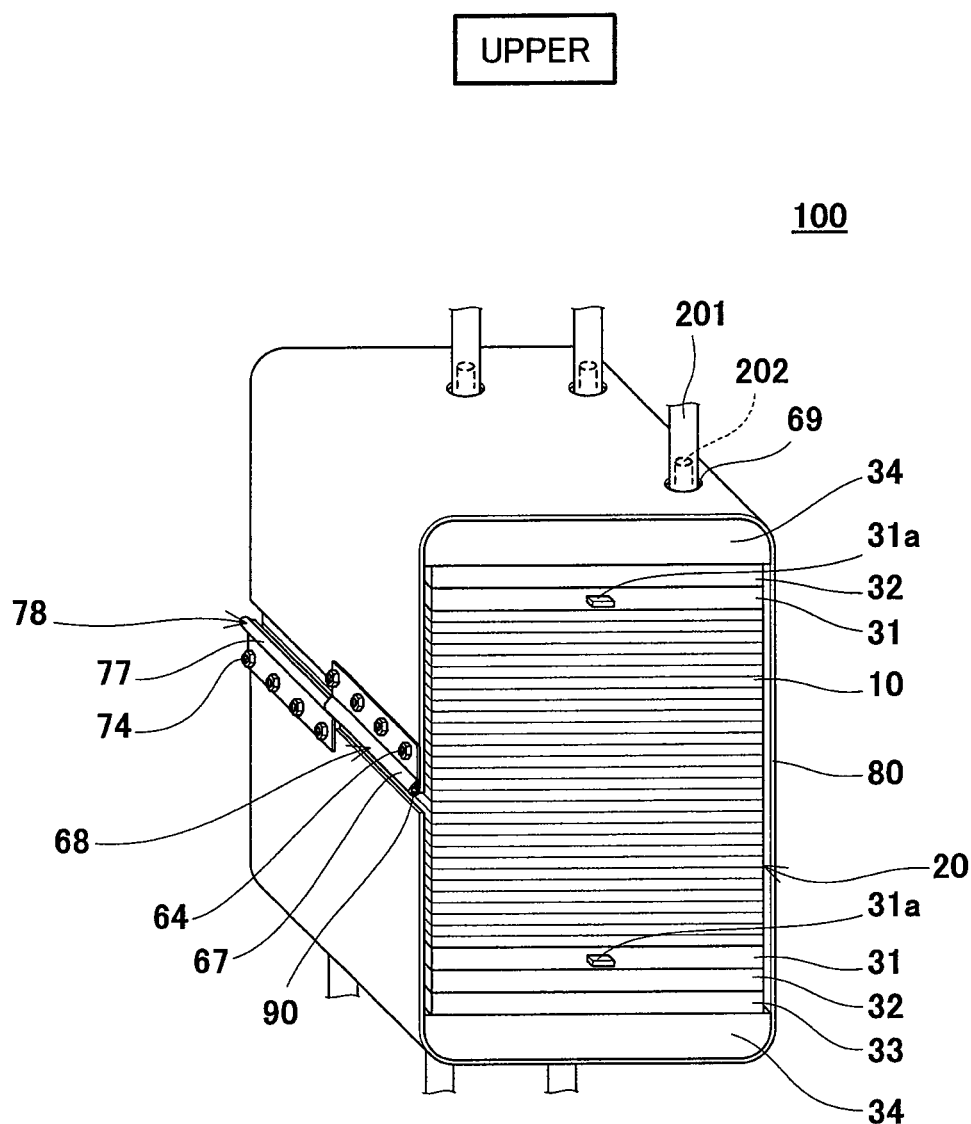
FIG. 10 is a perspective view schematically showing an exemplary configuration of a cell stack of a fuel cell according to Embodiment 5 of the present disclosure.
Figure 11:
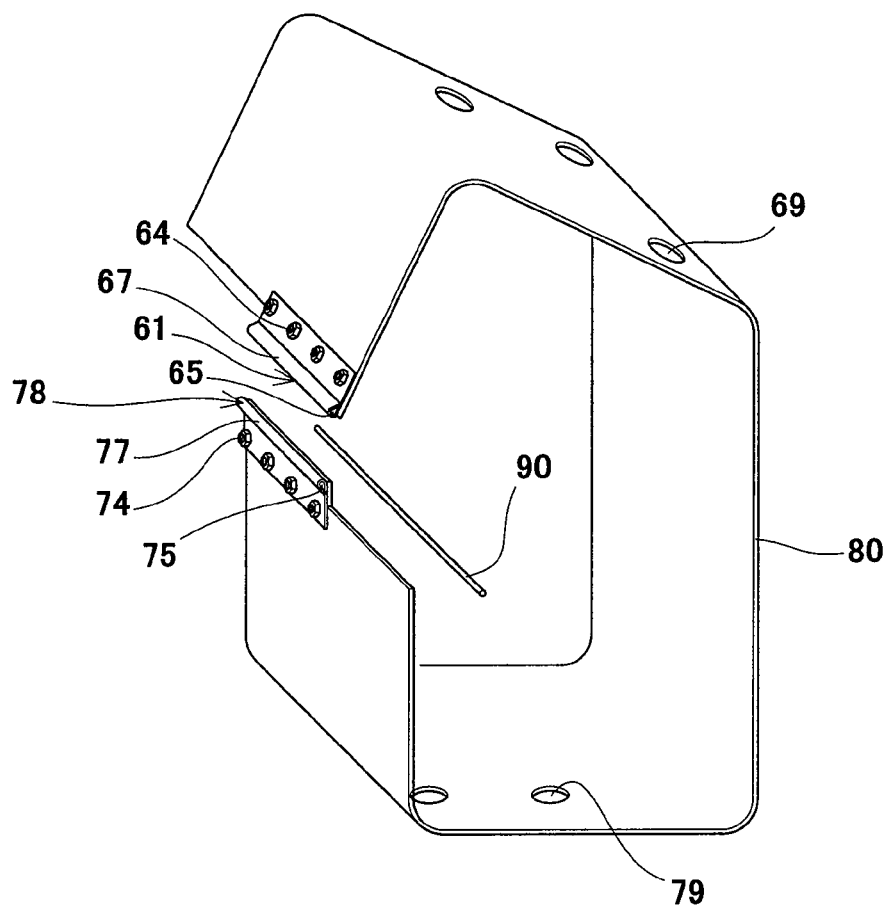
FIG. 11 is a perspective view schematically showing an exemplary configuration of a fastener band of the cell stack of the fuel cell of FIG. 10.

FIG. 10 is a perspective view schematically showing an exemplary configuration of a cell stack of a fuel cell according to Embodiment 5 of the present disclosure. FIG. 11 is perspective view schematically showing a configuration of a fastener band of the cell stack of the fuel cell of FIG. 10. In FIG. 10, the upper and lower sides of the cell stack of the fuel cell are expressed as the upper and lower sides in these Figures. In FIG. 11, the upper and lower sides of the first band member and the second band member are expressed as the upper and lower sides in these Figures.

As shown in FIGS. 10 and 11, the cell stack 100 of the fuel cell according to Embodiment 5 of the present disclosure has a structure which is basically identical to that of the cell stack 100 of the fuel cell according to Embodiment 1, except that the fastener band 80 is formed by a single member. Since the fastener band 80 is formed by a single member, a first band engagement portion 68 and a second band engagement portion 78 are provided at the both ends of the fastener band 80.

To be specific, the fastener band 80 is formed such that a band-like member is bent to form a tubular shape so as to surround the cell stack body 50, and the portion of the fastener band 80 which covers the upper surface of the cell stack body 50 (hereinafter referred to as the upper surface of the fastener band 80) is formed to be tilted obliquely upward with respect to a horizontal direction. Since the first band engagement portion 68 and the second band engagement portion 78 have the same structure as the first band member engagement portion 61 of the first band member 60, the fourth band member engagement portion 72 of the second band member 70 and others, detailed description thereof is omitted.

When fastening the cell stack 100 of the fuel cell, the fastener band 80 and the cell stack body 50 are pressed in such a manner that the upper surface of the fastener band 80 and the portion of the fastener band 80 which covers the lower surface of the cell stack body 50 (lower surface of the fastener band 80) are pressed using the presser unit (e.g., flat press machine) until the upper surface of the fastener band 80 is pressed down to be tilted slightly downward with respect to a horizontal direction. As a result the insertion hole 65 of the first band engagement portion 68 and the insertion hole 75 of the second band engagement portion 78 overlap each other when viewed from the direction perpendicular to the direction in which the cells 10 are stacked, and the engagement pin 90 can be inserted into the insertion hole 65 and the insertion hole 75. After the engagement pin 90 is inserted into the insertion hole 65 and the insertion hole 75, the pressing force applied by the presser unit is released, so that the fastener band 80 and the cell stack body 50 are pushed back up to a position where the upper surface of the fastener band 80 is horizontal, because of the elastic force of the elastic member 33. At this time, the first band engagement portion 68 and the second band engagement portion 78 are deformed due to their tensile forces and are allowed to adhere to the engagement pin 90. Thus, the cell stack 100 of the fuel cell is fastened.

The cell stack 100 of the fuel cell of Embodiment 5 configured as described above is able to achieve the same advantage as that of the cell stack 100 of the fuel cell of Embodiment 1.

Embodiment 6

Figure 12:
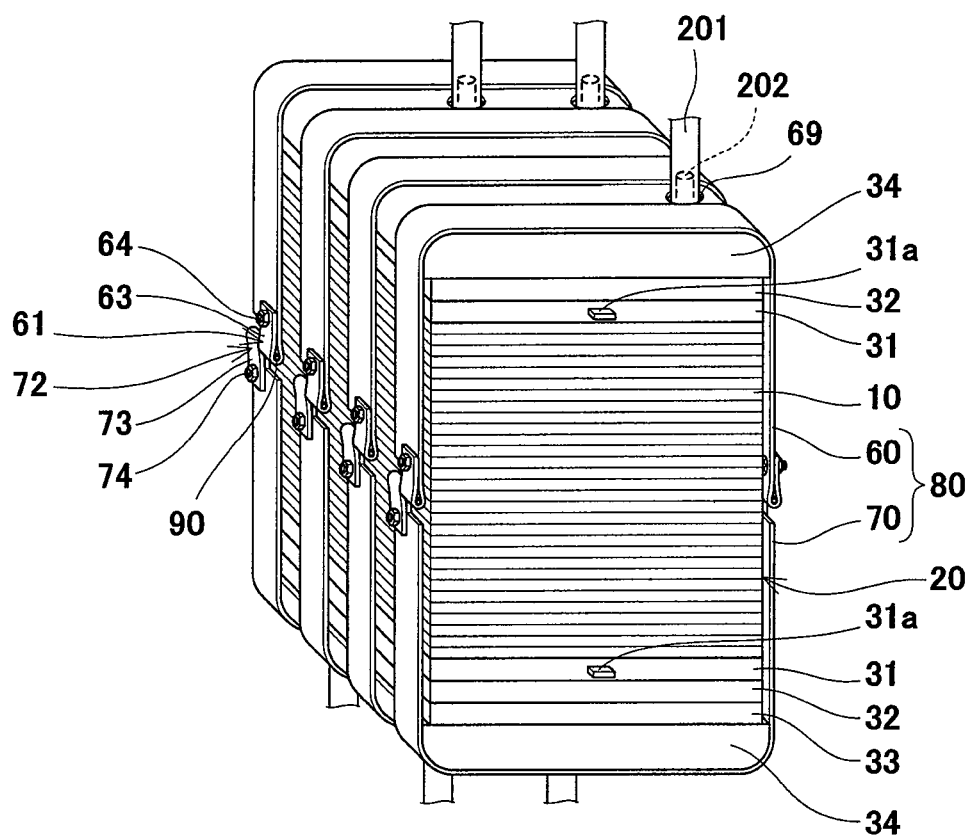
FIG. 12 is a perspective view schematically showing an exemplary configuration of a cell stack of a fuel cell according to Embodiment 6 of the present disclosure.

FIG. 12 is a perspective view schematically showing an exemplary configuration of a cell stack of a fuel cell according to Embodiment 6 of the present invention. In FIG. 12, the upper and lower sides of the cell stack of the fuel cell are expressed as the upper and lower sides in the Figure.

As shown in FIG. 12, the cell stack 100 of the fuel cell according to Embodiment 6 of the present disclosure has a structure which is basically identical to that of the cell stack 100 of the fuel cell according to Embodiment 1, except that the cell stack 100 of the fuel cell is fastened using plural (four) thinned and elongated fastener bands 80.

The cell stack 100 of the fuel cell of Embodiment 6 configured as described above is able to achieve the same advantage as that of the cell stack 100 of the fuel cell of Embodiment 1.

Embodiment 7

Figure 13:
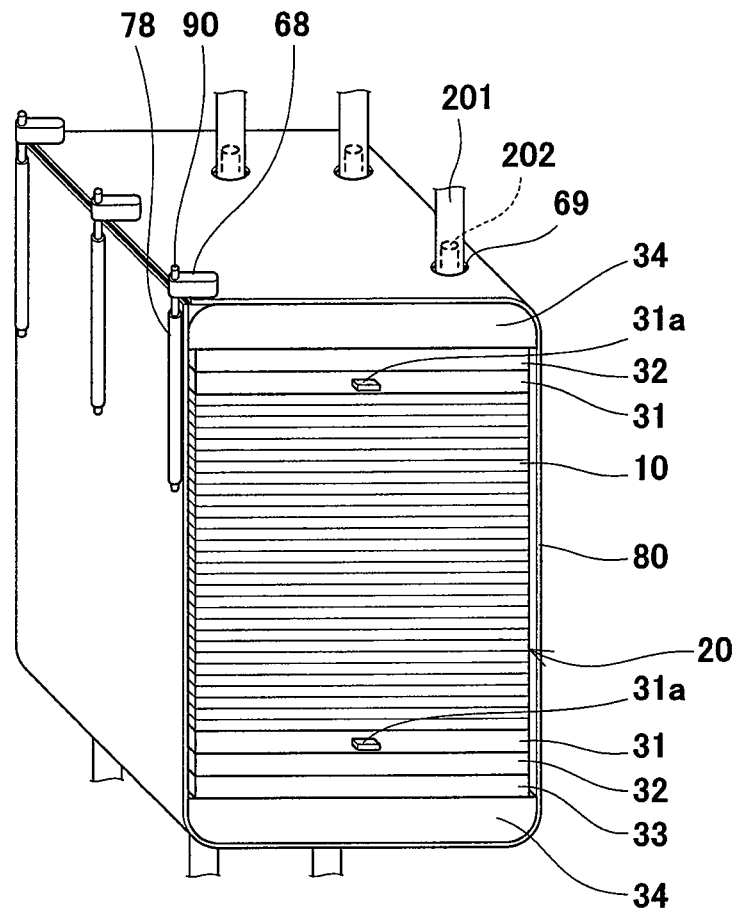
FIG. 13 is a perspective view schematically showing an exemplary configuration of a cell stack of a fuel cell according to Embodiment 7 of the present disclosure.

FIG. 13 is a perspective view schematically showing an exemplary configuration of a cell stack of a fuel cell according to Embodiment 7 of the present disclosure. In FIG. 13, the upper and lower sides of the cell stack of the fuel cell are expressed as the upper and lower sides in the Figure.

As shown in FIG. 13, the cell stack 100 of the fuel cell according to Embodiment 7 of the present disclosure has a structure which is basically identical to that of the cell stack 100 of the fuel cell according to Embodiment 5, except that the opening (both ends) of the fastener band 80 is formed to be located at a corner portion formed between the side surface and the upper surface of the cell stack body 50, and the first band engagement portion 68 and the second band engagement portion 78 are different in shape.

To be specific, each first band engagement portion 68 is formed by a columnar member and is provided on the upper surface of the fastener band 80 such that its tip end portion protrudes from the end of the upper surface of the fastener band 80. A through-hole is formed at the tip end portion of each first band engagement portion 68 so as to extend along the direction in which the cells 10 are stacked. In this embodiment, each first band engagement portion 68 is bonded to the upper surface of the fastener band 80 by welding. Each second band engagement portion 78 is formed by a tubular member and is bonded to the side surface of the fastener band 80.

The peripheral surfaces of the engagement pins 90 are configured to contact the inner surfaces of the first band engagement portions 68 and the inner surfaces of the second band engagement portions 78 by the elastic force in the upper surface of the fastener band 80 and the elastic force in the side surface of the fastener band 80 on which the second band engagement portions 78 are provided, which are applied in the direction to increase the opening of the fastener band 80, to be precise, the elastic force in the upper surface of the fastener band 80 in an upward direction, and the elastic force in the side surface of the fastener band 80 on which the second band engagement portions 78 are provided, which is applied in the direction from the side surface on which the second band engagement portions 78 are not provided toward the side surface on which the second band engagement portions 78 are provided. Thus, the engagement pins 90, the first band engagement portions 68 and the second band engagement portions 78 are fixed, and the cell stack 100 of the fuel cell is fastened.

The cell stack 100 of the fuel cell of Embodiment 7 configured as described above is able to achieve the same advantage as that of the cell stack 100 of the fuel cell of Embodiment 1.

Numerous modifications and alternative embodiments of the present disclosure will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the disclosure.

What is claimed is:

1. A cell stack of a fuel cell comprising:
   a cell stack body including a cell stack structure including plural cells stacked together; an elastic member disposed at an end of the cell stack structure in a direction in which the cells are stacked; and a pair of end plates sandwiching the cell stack structure and the elastic member; and
   a fastener band extending so as to surround the cell stack body and to cover a pair of end surfaces and a pair of opposing side surfaces of the cell stack body, the fastener band including a first band engagement portion and a second band engagement portion at both end portions thereof, respectively,
   wherein the cell stack body is fastened by the fastener band by direct or indirect engagement between the first band engagement portion and the second band engagement portion, and
   wherein the fastener band is disposed such that the first band engagement portion and the second band engagement portion are located on the side surface of the cell stack structure,
   said cell stack further comprising:
   an engagement pin,
   wherein the first band engagement portion and the second band engagement portion have a first insertion hole and a second insertion hole, respectively,
   wherein the engagement pin is inserted into the first insertion hole of the first band engagement portion and the second insertion hole of the second band engagement portion to cause the first band engagement portion and the second band engagement portion to be engaged with each other via the engagement pin,
   wherein the engagement pin has a peripheral surface having a circular-arc portion, and
   wherein the circular-arc portion of the engagement pin is engaged with an inner surface formed by the first insertion hole of the first band engagement portion and an inner surface formed by the second insertion hole of the second band engagement portion.

2. The cell stack of the fuel cell according to claim 1,
wherein the first band engagement portion and the second band engagement portion are provided such that the first insertion hole and the second insertion hole are arranged in a direction perpendicular to the direction in which the plural cells are stacked.

3. The cell stack of the fuel cell according to claim 2,
wherein the first band engagement portion protrudes from one end of the fastener band in a first direction relative to the direction in which the plural cells are stacked;
wherein the second band engagement portion protrudes from the other end of the fastener band in a second direction relative to the direction in which the plural cells are stacked, the second direction being opposite to the first direction; and
wherein the first band engagement portion and the second band engagement portion are provided such that the first insertion hole of the first band engagement portion and the second insertion hole of the second band engagement portion extend along a side surface of the cell.

4. The cell stack of the fuel cell according to claim 1,
wherein the second band engagement portion is provided such that the second band engagement portion and the first band engagement portion are arranged in a direction perpendicular to the direction in which the plural cells are stacked and parallel to the pair of side surfaces of the cell stack structure; and
wherein the first band engagement portion and the second band engagement portion are provided such that the first and second insertion holes are arranged in the direction perpendicular to the direction in which the plural cells are stacked and parallel to the pair of side surfaces of the cell stack structure.

5. The cell stack of the fuel cell according to claim 1,
wherein the first band engagement portion and the second band engagement portion are deformed by a load applied to fasten the cell stack of the fuel cell.

6. The cell stack of the fuel cell according to claim 1,
wherein the first band engagement portion and the second band engagement portion are provided so as not to overlap each other when viewed from the direction in which the plural cells are stacked.

7. The cell stack of the fuel cell according to claim 1,
wherein the first band engagement portion and the second band engagement portion are provided so as to overlap each other when viewed from the direction perpendicular to the direction in which the plural cells are stacked.

8. The cell stack of the fuel cell according to claim 1,
wherein the fastener band includes a first band member and a second band member;
wherein the first band member has a first band member engagement portion at one end portion thereof and a second band member engagement portion at the other end portion thereof;
wherein the second band member has a third band member engagement portion at one end portion thereof and a fourth band member engagement portion at the other end portion thereof;
wherein the first band engagement portion includes the first band member engagement portion and the third band member engagement portion, and the second band engagement portion includes the second band member engagement portion and the fourth band member engagement portion; and
wherein the first band member engagement portion and the fourth band member engagement portion are directly or indirectly engaged with each other and the second band member engagement portion and the third band member engagement portion are directly or indirectly engaged with each other, to cause the cell stack body to be fastened by the fastener band.

9. The cell stack of the fuel cell according to claim 8,
wherein the first band member and the second band member are configured such that the ends thereof are located at centers of the side surfaces of the cell stack body, respectively.

10. The cell stack of the fuel cell according to claim 1, wherein the elastic member is a sheet made of rubber.

11. The cell stack of the fuel cell according to claim 1, wherein the elastic member is formed by compressive springs.

12. The cell stack of the fuel cell according to claim 1,
wherein each of the first band engagement portion and the second band engagement portion has, at an end portion of the fastener band, a long axis extending in the direction in which the plural cells are stacked and a short axis extending in a direction perpendicular to the long axis, and the long axis has a length which is not less than twice as large as a length of the short axis.

13. The cell stack of the fuel cell according to claim 1,
wherein the fastener band is provided with a hole into which a pipe is inserted to supply or discharge a fluid flowing in the cell stack body.

14. The cell stack of the fuel cell according to claim 1,
wherein each of the first band engagement portion and the second band engagement portion has a loop structure formed by folding back a corresponding end portion of the fastener band.

15. The cell stack of the fuel cell according to claim 14, wherein the loop structure has a long axis and a short axis extending in a direction perpendicular to the long axis, and the long axis has a length which is at least twice as large as a length of the short axis.

16. A cell stack of a fuel cell comprising:
a cell stack body including a cell stack structure including plural cells stacked together;
an elastic member disposed at an end of the cell stack structure in a direction in which the cells are stacked; and
a pair of end plates sandwiching the cell stack structure and the elastic member; and
a fastener band extending so as to surround the cell stack body and to cover a pair of end surfaces and a pair of opposing side surfaces of the cell stack body, the fastener band including a first band engagement portion and a second band engagement portion at both end portions thereof, respectively;
wherein the cell stack body is fastened by the fastener band by direct or indirect engagement between the first band engagement portion and the second band engagement portion,
wherein the fastener band is disposed such that the first band engagement portion and the second band engagement portion are located on the side surface of the cell stack structure,
said cell stack further comprising:
an engagement pin;
wherein the first band engagement portion and the second band engagement portion have a first insertion hole and a second insertion hole, respectively; and
wherein the engagement pin is inserted into the first insertion hole of the first band engagement portion and the second insertion hole of the second band engagement portion to cause the first band engagement portion and the second band engagement portion to be engaged with each other via the engagement pin, wherein the first band engagement portion and the second band engagement portion are provided such that the first insertion hole and the second insertion hole are arranged in a direction perpendicular to the direction in which the plural cells are stacked, wherein the first band engagement portion protrudes from one end of the fastener band in a first direction relative to the direction in which the plural cells are stacked, wherein the second band engagement portion protrudes from the other end of the fastener band in a second direction relative to the direction in which the plural cells are stacked, the second direction being opposite to the first direction, and wherein the first band engagement portion and the second band engagement portion are provided such that the first insertion hole of the first band engagement portion and the second insertion hole of the second band engagement portion extend along a side surface of the cell.

* * * * *